(No Model.) 2 Sheets—Sheet 1.
E. A. TRAPP.
BICYCLE SUPPORT.
No. 602,669. Patented Apr. 19, 1898.
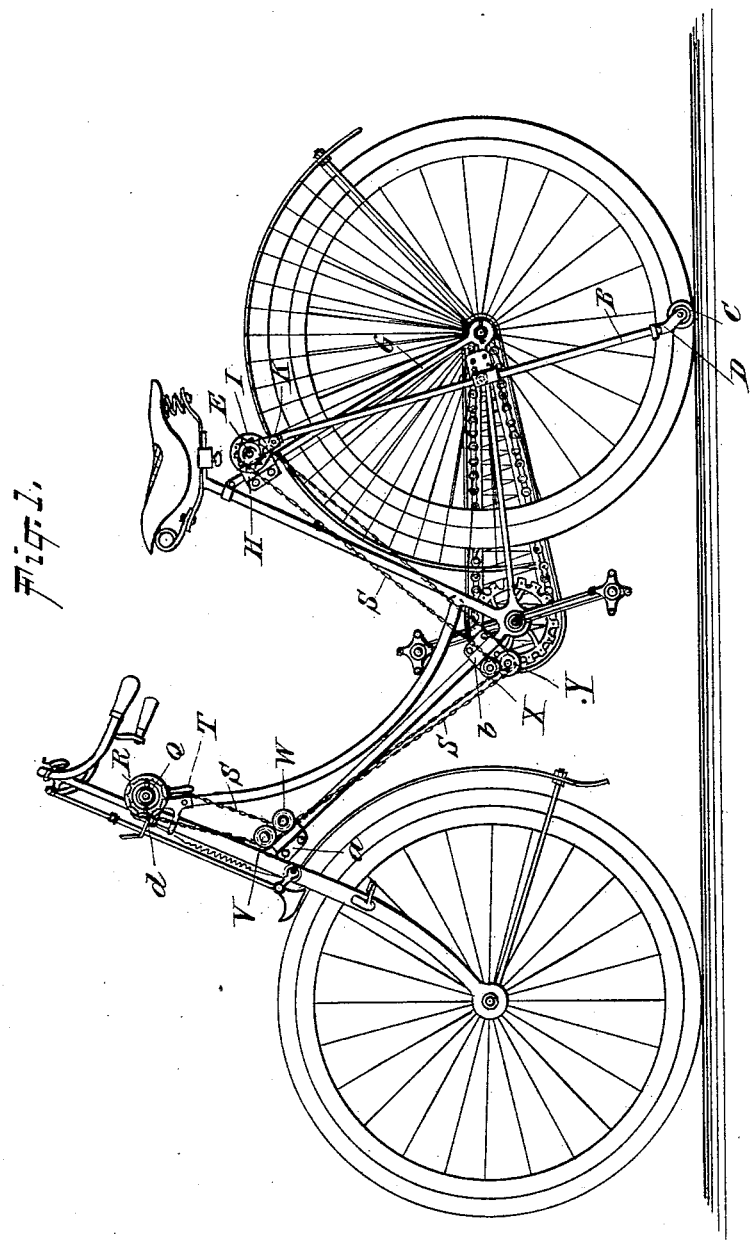
WITNESSES:
E. Jos. Belknap.
Edward D. Miller.
INVENTOR
Edward A. Trapp,
BY
Chas. C. Gill
ATTORNEY.

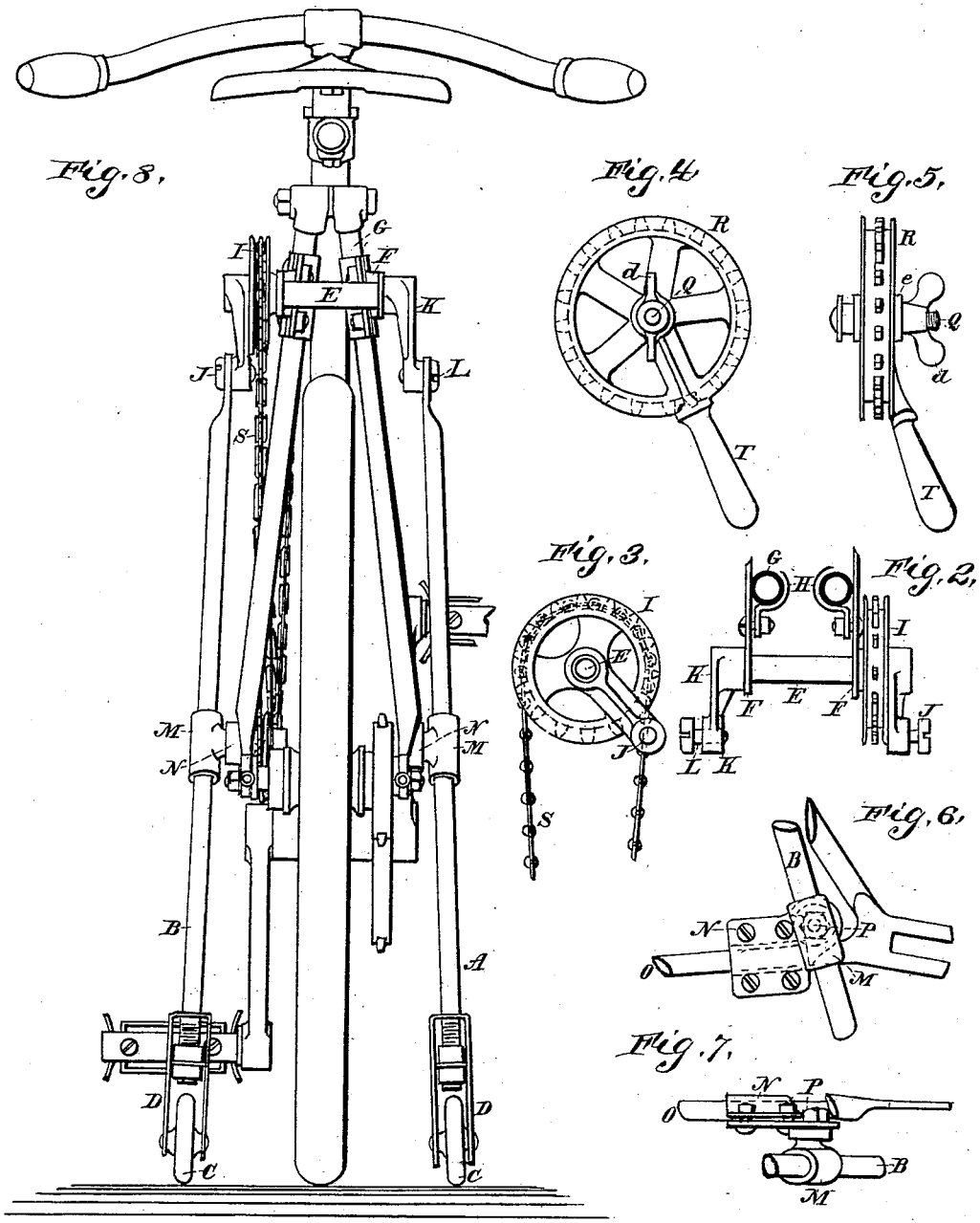

UNITED STATES PATENT OFFICE.

EDWARD A. TRAPP, OF NEW YORK, N. Y.

BICYCLE-SUPPORT.

SPECIFICATION forming part of Letters Patent No. 602,669, dated April 19, 1898.

Application filed September 1, 1896. Serial No. 604,538. (No model.)

*To all whom it may concern:*

Be it known that I, EDWARD A. TRAPP, a citizen of the United States, and a resident of New York, in the county of New York and State of New York, have invented certain new and useful Improvements in Bicycles, of which the following is a specification.

The invention relates to improvements in bicycles; and it consists in the novel means hereinafter described for supporting the wheel in a vertical position while at rest whether or not the rider is seated upon the saddle.

In accordance with my invention I provide supporting-rods upon the opposite sides of the rear wheel of the bicycle, and these rods are operated from a crank-shaft set in motion by the rider. In connection with the supporting-rods for maintaining the bicycle in its upright position while at rest I provide locking means by which said rods may be securely maintained in either their upward or lower position. When the bicycle is in running condition, the supporting-rods will be maintained in an elevated position, and when the bicycle is at rest or has been brought to a stop the said rods will be lowered and locked in their lower position, in which position they will effectually maintain the bicycle from falling sidewise.

One of the objects accomplished by my invention is that it enables the rider while seated upon the saddle to come to a full stop in the middle of the road or elsewhere without alighting from the wheel, the mechanism connected with the supporting-rods and the supporting-rods themselves being such that the rider without dismounting may maintain the wheel in its upright position while at rest any desired length of time.

The invention will be more fully understood from the detailed description hereinafter presented, reference being had to the accompanying drawings, forming a part of this application, and in which—

Figure 1 is a side elevation of a bicycle provided with supports and their connections arranged and constructed in accordance with the invention sought to be protected hereby. Fig. 2 is a detached top view of the crank-shaft by which the said supports are operated and showing also the means by which the crank-shaft is supported from the upper rear frame of the bicycle. Fig. 3 is a detached side elevation of a part of same. Fig. 4 is a detached side elevation of the operating-wheel for the sprocket-chain which actuates the crank-shaft to raise or lower said supports. Fig. 5 is an edge view of same. Fig. 6 is an enlarged detached side elevation of the swiveled sleeve secured to each side of the lower rear frame of the bicycle and through which the bicycle-supports pass, and Fig. 7 is a detached top view of same. Fig. 8 is a rear end view of the bicycle employing my invention.

The bicycle shown in every respect, with the exception of the supports and their connections made the subject hereof, is of known construction and need not be specifically described herein. The supports constituting my invention are shown applied to these well-known forms of bicycles, and in the drawings A B respectively designate the two supports or supporting-rods, one located at each side of the rear wheel of the bicycle and both having at their lower ends the swiveled wheels C C, which are mounted in the frames D, extending outward from the longitudinal line of center of said rods and swiveled in the lower ends of said rods.

The rods A B extend upward and inward, and at their upper ends are connected with a crank-shaft, by which said rods may be raised or lowered at will. When the bicycle is in running condition, the supporting-rods A B will be in their elevated position, and when the bicycle is to remain at rest in a vertical position, whether or not the rider is seated upon the saddle, the said rods A B will be caused to descend to their lower position and be there securely locked. It is intended that the wheels C C, carried by the rods A B, shall not (while the bicycle is in a truly vertical position) entirely reach the ground, but shall very nearly approach the same.

It will be observed upon reference to Figs. 1 to 7, inclusive, that the upper ends of the rods A B are operated from the crank-shaft E, which is mounted in the bearings F F, supported from the upper rear forked frame G of the bicycle by means of the sleeves H. (More fully shown in Fig. 2.) Upon one end of the crank-shaft E is rigidly secured the sprocket-wheel I, having the crank-pin J, and upon the other end of said crank-shaft E is secured the crank K, having the crank-pin L. The upper end of one of the rods A B is secured on the crank-pin J, and the like end of the other one of the rods A B is secured upon the crank-pin L, and hence the rotation of the crank-shaft E will, through the said crank-pins J and L, operate to raise or lower the said rods A B. In order that the rods A B of the bicycle may be elevated and depressed and at the same time have the necessary freedom of lateral motion when moved by the crank-pins J L, I have provided the sleeves M, one at each side of the bicycle, through which the rods A B pass and which, as illustrated in Figs. 6 and 7, are each swiveled to the frame or sleeve N, clamped upon the lower rear forked side O of the bicycle. The sleeves M will guide the rods A B, and being swiveled or pivotally secured to the frames N will be enabled to turn or yield with the lateral movement of said rods A B during the elevation and depression of the latter. The pin securing the sleeve M to the frame N is lettered P in Figs. 6 and 7.

From the above description it will be seen that the rotation of the crank-shaft E operates to elevate or depress the rods A B, and this rotation of the shaft E is effected from the sprocket-wheel R on the shaft Q, mounted on the front fork of the bicycle through the medium of the sprocket-chain S, which passes over said wheel R and the sprocket-wheel I, secured upon the said crank-shaft E. The sprocket-wheel R may be rotated by the handle T, secured thereto, as shown in Figs. 1, 4, and 5, and in order that the sprocket-chain S may be disposed in a manner not to interfere with the rider the said chain is passed over the sprocket-wheels V W X Y, as shown in Fig. 1. The sprocket-wheels V W are secured to a frame $a$, clamped upon the upper end of the lower front side of the frame of the bicycle, while the sprocket-wheels X Y are secured to the frame $b$, clamped upon the lower end of said lower front side of the bicycle-frame.

The handle T, connected with the sprocket-wheel R, is in convenient position to be grasped by the rider, and the power applied to it is transferred through the intermediate mechanism above described to the crank-shaft E, whereby the rods A B may be raised or lowered at will, whether the rider is or is not upon the saddle.

It is desirable that the rods A B be rigidly secured in their upper and lower positions, and hence in the form of construction illustrated in Figs. 1 to 7, inclusive, I provide upon the shaft Q a threaded outer end to receive the thumb-screw $d$, which may be turned to clamp the washer $e$ against the sprocket-wheel R, and thereby clamp the same upon the shaft Q, which does not rotate. When the thumb-screw $d$ is thus firmly moved toward the sprocket-wheel R, the latter will be held stationary thereby, and hence at such time the chain S will be incapable of movement and the rods A B will be held stationary by the crank-shaft E, the latter being incapable of movement when the chain S is rigidly held.

The operation of elevating and lowering the supporting-rods A B has been fully described above in connection with the explanation of the means whereby the said rods are made capable of elevation and depression. When the rods A B are in their upper position, they will be clear of the ground and out of the way, but when said rods are in their lower position they will operate to maintain the bicycle in its upright position whether or not the rider is on the saddle.

What I claim as my invention, and desire to secure by Letters Patent, is—

In a bicycle of the "safety" type, the supporting-rods extending downward and rearward on opposite sides of the rear wheel and from a point in rear of the saddle-post and adjacent to the top of the forward portion of the said rear wheel, and the sleeves swiveled to or pivotally mounted upon the rear portion of the bicycle-frame and at opposite sides of the latter, said sleeves receiving and guiding said rods and turning with the same during the oscillating movements of said rods created therein during their vertical movements, combined with the crank-shaft journaled to said frame adjacent to the upper ends of said rods and over said rear wheel and below the saddle, the cranks rigid with said shaft and pivoted to the upper ends of said rods for operating the latter from said shaft, means under the control of the rider for actuating said shaft to raise said rods, and means for positively locking said rods in their respective upper and lower positions; substantially as and for the purposes set forth.

Signed at New York, in the county of New York and State of New York, this 29th day of August, A. D. 1896.

EDWARD A. TRAPP.

Witnesses:
CHAS. C. GILL,
E. JOS. BELKNAP.